United States Patent [19]

Kagawa et al.

[11] Patent Number: 5,547,780

[45] Date of Patent: Aug. 20, 1996

[54] BATTERY PRECURSOR AND A BATTERY

[75] Inventors: Hiroshi Kagawa; Shiro Kato; Kazuo Murata, all of Takatsuki, Japan

[73] Assignee: Yuasa Corporation, Osaka, Japan

[21] Appl. No.: 180,424

[22] Filed: Jan. 12, 1994

[30] Foreign Application Priority Data

| Jan. 18, 1993 | [JP] | Japan | 5-023774 |
| Mar. 11, 1993 | [JP] | Japan | 5-078742 |
| Mar. 11, 1993 | [JP] | Japan | 5-078743 |
| Mar. 12, 1993 | [JP] | Japan | 5-079166 |
| May 18, 1993 | [JP] | Japan | 5-139987 |
| Aug. 18, 1993 | [JP] | Japan | 5-226501 |

[51] Int. Cl.$^6$ ........................ H01M 6/46
[52] U.S. Cl. ............. 429/149; 429/156; 429/162; 429/185; 429/127
[58] Field of Search .......... 429/149, 152–154, 429/156–160, 162, 185, 127

[56] References Cited

U.S. PATENT DOCUMENTS 3,723,181  3/1973  Oakley ...................... 429/152
3,775,188  11/1973  Oltman et al. .

OTHER PUBLICATIONS

Patent Abstracts of Japan, vol. 6, No. 182 (E–131), Sep. 18, 1982.
Patent Abstracts of Japan, vol. 16, No. 539, (E–1289), Nov. 10, 1992.
Patent Abstracts of Japan, vol. 9, No. 204 (E–337) (1927), Aug. 21, 1985.

Primary Examiner—Anthony Skapars
Attorney, Agent, or Firm—Evenson, McKeown, Edwards & Lenahan, P.L.L.C.

[57] ABSTRACT

This invention provides a battery precursor for producing a battery through a cutting process, in which a large number of battery elements comprising positive active material layers, separators having electrolytes and negative active material layers are installed in parallel between a plate-like positive current collector plate and a negative current collector plate facing each other, and the respective battery elements are partitioned each other and sealed by insulators. According to this battery precursor, a battery having a voluntary shape can be obtained easily by cutting only.

23 Claims, 14 Drawing Sheets

BATTERY PRECURSOR AND A BATTERY

BACKGROUND OF THE INVENTION

This invention relates to a structure etc. of a battery for use in the fields of electronic equipment, toys and accessories etc.

As shown by FIG. 40 and FIG. 41, conventional batteries 201 and 202 have a fixed shape such as rectangular or circular. Therefore, a battery could not be installed conveniently in an excessive space of an electronic circuit because a shape of the battery could no be changed when using the battery for driving the electronic circuit, therefore a space for installing the battery was provided in a separate position. For this reason, a dead space occupied in the electronic equipment became large and thus the size of the entire equipment increased. When an attempt was made to manufacture a battery having a shape adapted to an excessive or extra space or an electronic circuit in order to solve this problem, a production process and production facility such as a metal mold etc. must be changed according to the respective shapes of the batteries desired so that the manufacturing cost of the battery increased.

Further, when manufacturing a large number of coin type batteries 203 for example, they were made up scatteringly as shown by FIG. 42. For this reason, control and transportation after that were extremely troublesome.

SUMMARY OF THE INVENTION

This invention was made in consideration of the above problems. An object of this invention is to obtain a battery having a desired shape and further to make easy the control and transportation of the obtained battery.

In the first place, this invention provides a battery precursor for producing a battery through a cutting process in order to easily obtain a battery of voluntary shape.

The battery precursor of this invention is characterized in that a large number of battery elements comprising positive active material layers, separators having electrolytes, and negative active material layers, are installed in parallel between a plate-like positive current collector plate and a negative current collector plate facing each other. The respective battery elements are partitioned each other and sealed by insulators. When this battery precursor is used, a battery having a voluntary shape can be obtained easily by only cutting the structure. Further, since batteries having various shapes can be obtained from the battery precursor having the same structure, it is not required to change the production process of the battery precursor in a case when obtaining a battery of any shape, so that the production cost of the battery can be reduced.

In the above battery precursor, structures of following items (1) to (4) may be used.

(1) Each current collector plate is continuous in the entire area without being interrupted. (2) A part between adjoining battery elements of at least one of both current collector plates is narrowed because a penetration portion is formed thereat. According to this structure, it is enough to cut the narrowed part to cut the current collector plate so that the cutting work becomes simple. Further, the following structures may be adopted here.

(i) A width of the narrowed part is 0.2 to 1.0 mm. According to this structure, a peripheral portion can be prevented from being thermally deformed due to preheating when cutting the current collector plate by using a laser beam.

(ii) A distance of the penetration portion normal to the width of the narrowed part is 0.1 to 1.0 mm. According to this structure, an electric short-circuiting through the production facility can be prevented when carrying out the cutting by machining, and a lowering of the battery capacity efficiency can be prevented.

(3) Penetration portions are formed on parts between adjoining battery elements of the respective current collector plates, the penetration portion of the positive active material faces on a non-penetration portion of the negative active material, and the penetration portion of the negative active material faces on a non-penetration portion of the positive active material. According to this structure, it is enough to cut the narrowed part in order to cut the current collector plate so that the cutting work becomes simple. Further, the electric short-circuiting through the production facility can be prevented when carrying out the cutting by machining.

(4) Slitted penetration portions are formed on parts between adjoining battery elements of at least one of both current collector plates and recessed portions are formed on parts of the insulator facing on the penetration portions. According to this structure, a laminate type battery can be obtained by bending the battery obtained by cutting at the penetration portion and the recessed portion. The cutting work can be eliminated by tearing it off at the penetration portion and the recessed portion. Further, the following structures may be used here.

(i) Penetration portions are formed on both current collector plates, the penetration portion of the positive current collector plate faces on a non-penetration portion of the negative current collector plate, and the penetration portion of the negative current collector plate faces on a non-penetration portion of the positive current collector plate. According to this structure, the current collector plate is not deformed at the bent portion and failure of bonding between both current collector plates and the insulator does not occur. Breakage at the bent portion also does not take place.

(ii) The recessed portion has an acute-angled bottom formed by cutting-in, and has at its opening a swollen portion along an edge of the penetration portion. According to this structure, the bending becomes simple and the swollen portion can prevent peeling-off of the insulator from the current collector plate.

(iii) Penetration portions penetrating even the battery elements are formed on parts of the positive current collector plate and the negative current collector plate contacting with corners of the respective battery elements, the penetration portion of the positive current collector plate faces on a non-penetration portion of the negative current collector plate, and the penetration portion of the negative current collector plate faces on a non-penetration portion of the positive current collector plate. According to this structure, take-out of terminal from the laminate type battery becomes easy.

(iv) A thickness is larger than 0.15 mm incl. and smaller than 1 mm incl. According to this structure, a deformation of a battery element caused by the bending can be prevented.

In the next place, this invention adopts a structure of following item (5) to the battery precursor in order to easily obtain a battery of voluntary shape and to make easy control and transportation of the obtained battery.

(5) The battery precursor is held by a retainer plate by being bonded onto the plate at one side of both current collector plates. According to this structure, batteries obtained by cutting are prevented from being scattered so that the control and transportation become easy. Further, the following structure may be adopted.
  (i) The retainer plate is made of a semi-sticky film. According to this structure, the battery obtained by cutting can be easily taken out as occasion demands. The following structure (a) may be adopted in the item (i).
  (a) An adhesive strength of the semi-sticky film is created by a surface property of the film. According to this structure, the taken-out battery can be prevented from being stained by the retainer plate.

Further, the following structures may be adopted in the above battery precursor.
  (i) A thickness is smaller than 5 mm incl. and a thickness of the insulator is smaller than 3 mm incl. According to this structure, a fraction defective of battery can be reduced and a battery capacity efficiency can be prevented from being lowered.
  (ii) The insulator is made of a material deformable by pressure. According to this structure, a part of the current collector plate contacting the insulator can be recessed so that a position to be cut can be known correctly.
  (iii) The separator is a solid electrolyte. According to this structure, leakage of the electrolyte does not occur even when the precursor is cut at a part other than the insulator 5.

In the third place, this invention provides a manufacturing method described in the following items (1) and (2) in order to manufacture the above-mentioned battery precursor positively.

(1) A method for manufacturing a battery precursor, in which the battery precursor is so constructed that a large number of battery elements comprising positive active material layers, separators having electrolytes and negative active material layers are installed in parallel between a plate-like positive current collector plate and a negative current collector plate facing each other, the respective battery elements are partitioned with respect to each other and sealed by insulators, a large number of penetration portions are formed on parts of at least one of both current collector plates contacting with the insulator, the current collector plate on which the penetration portions are formed is reinforced by bonding a resin film onto one surface of it, and then formation processes of the battery element and insulator are carried out. Further, the following structures may be adopted here.
  (i) The resin film is finally peeled off.
  (ii) The resin film is used as it is for an outer package film.

According to this structure, an effective use can be attained.

(2) A method for manufacturing the battery precursor differing from the above method, in which the current collector plate on which the penetration portions are formed is reinforced by forming the insulator onto one surface of it, and then a formation process of the battery element is carried out.

In the fourth place, this invention provides a battery obtained from a battery precursor shown by the following item
  (1), as a battery which can be installed without creating a dead space in an electronic circuit.
  (1) A battery constructed by integrating plural plate-like unit batteries, in which the unit batteries are so integrated on a plane as to be connected in parallel in a voluntary direction, and the unit battery is constructed in such a way that a battery element comprising a positive active material layer, a separator having an electrolyte and a negative active material layer is sandwiched between a plate-like positive current collector plate and a negative current collector plate facing each other, and the battery element is surrounded and sealed by an insulator. According to this structure, an air-tightness of the battery element located inside i.e. an air-tightness of the entire battery, can be improved. It can be installed on a printed substrate easily. A leakage of component material of the battery element can be prevented. Further, the following structure may be adopted here.
  (i) A part between adjoining battery elements of at least one of the positive current collector plate and the negative current collector plate is narrowed because a penetration portion is formed thereat. A width of the narrowed part is larger than 0.2 mm and smaller than 1.0 mm. According to this structure, the narrowed portion functions as a fuse. In addition, a battery capacity efficiency can be prevented from being lowered.
  (ii) A peripheral edge of at least one of the positive current collector plate and the negative current collector plate is located at an inside of the insulator. According to this structure, both current collector plates are prevented from contacting beyond the insulator so that an electric short-circuiting can be positively prevented.
  (iii) A slitted penetration portion is formed on a part between adjoining battery elements of at least one of the positive current collector plate and the negative current collector plate, a recessed portion is formed at a part the insulator facing on the penetration portion, and battery elements are laminated by being bent at the penetration portion and the recessed portion. According to this structure, a laminate type battery can be obtained by bending the battery element at the penetration portion and the recessed portion without producing a deformation of the battery element, so that a plane space for installation can be minimized.

In the item (iii), the following structures (a) and (b) may be used.
  (a) The recessed portion has an acute-angled bottom formed by cutting-in, and has at its opening a swollen portion along an edge of the penetration portion. According to this structure, peeling-off of the insulator from the current collector plate can be prevented.
  (b) Penetration portions penetrating even the battery elements are formed on parts of the positive current collector plate and the negative current collector plate contacting with corners of the respective battery elements, the penetration portion of the positive current collector plate faces on a non-penetration portion of the negative current collector plate, and the penetration portion of the negative current collector plate faces on a non-penetration portion of the positive current collector plate. According to this structure, removing a terminal becomes easy.

In the fifth place, this invention provides a manufacturing method of a battery easily and positively from a battery precursor shown in the following item (1).

(1) A manufacturing method of a battery from a battery precursor, in which the battery precursor is so constructed that a large number of battery elements comprising positive active material layers, separators having electrolytes, and negative active material layers, are installed in parallel between a plate-like positive current collector plate and a negative current collector plate facing each other, and the respective battery elements are partitioned with respect to each other and sealed by insulators, and portions of both current collector plates contacting with the insulator are cut and the insulator is also cut so that they fit to a contour of a battery of desired shape. Further, the following structures may be adopted here.

(i) A part other than the insulator is partially cut so that they fit to a contour of a battery of a desired shape.

(ii) A part or the entire part of the cutting process is carried out by using a thomson blade, ultrasonic wave, punching or wire cutting.

(iii) A part or the entire part of the cutting process is carried out by using a laser beam. According to this structure, an electric short-circuiting is not produced at the time of cutting because the cutting is carried out through a non-contact manner.

The following structures (a), (b) and (c) may be adopted in the item (iii).

(a) An irradiation direction is controlled by a computer. According to this structure, the cutting work can be done correctly and a change of the cutting work can be done quickly.

(b) At least laser beam sources for width direction and longitudinal direction are equipped. According to this structure, a work efficiency of the cutting work can be improved.

(c) Laser beam can be irradiated from both upper side and lower side. According to this structure, a projection can be formed on the insulator. In the item (a), the following structure may be adopted. That is, information input to a computer control part is done by a key board or an external circuit.

(iv) A part between adjoining battery elements of at least one of the current collector plates is narrowed because a penetration portion is formed thereat, this narrowed portion is molten cut, and the insulator is then cut off. According to this structure, an electric short-circuiting is not produced even when the cutting after molten cutting is done by machining.

(v) The battery precursor is cut by using-as a ground paper a retainer plate bonded to one side of both current collector plates. According to this structure, the cutting can be done by a half-cutting system and obtained batteries can be prevented from being scattered.

Aluminum, stainless steel, titan etc. are preferably used for the material of the positive current collector plate and stainless steel, iron, nickel, copper etc. are preferably used for the material of the negative current collector plate. Metal oxides such as manganese, vanadium, cobalt etc. may be mentioned as the positive active material; and lithium alloys such as lithium-aluminum, lithium-lead, lithium-tin, lithium-gallium, Wood's alloy etc., carbon material such as carbon etc., and lithium metals etc. may be mentioned as the negative active material. However, the kind of material is not limited to them those listed. A material cross-linked by ether bonding to polyether having a multifunctional hydroxyl group by means of diacrylate may be mentioned as the solid electrolyte. Cyclic esters such as propylene carbonate, ethylene carbonate etc.; tetrahydrofulan or its derivatives; ethers such as 1,3-dioxoran, 1,2-dimethoxyethane etc. may be used for the non-aqueous electrolyte included in the electrolyte in a single form or by being combined with two or more kinds. However, the kind is not limited to them. Lithium salts such as $LiClO_4$, LiSCN, $LiAsF_6$, $LiCF_3SO_3$, $LiCF_3SO_2$ etc. may be mentioned as the ionic compound included in the electrolyte, however, the kind is not limited to them.

DETAILED DESCRIPTION OF THE INVENTION (Embodiment 1)

This embodiment relates to a battery precursor.

Figure 1:
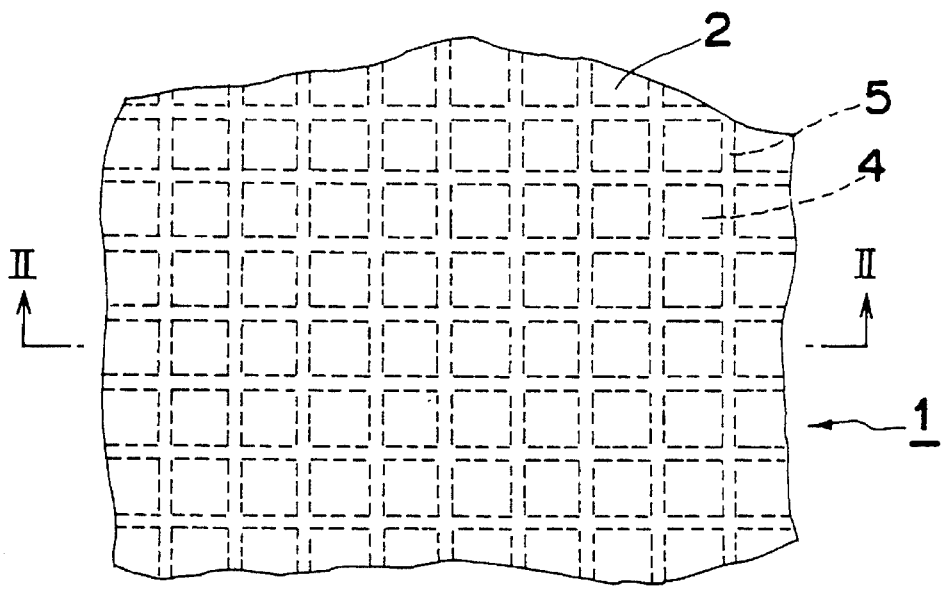
FIG. 1 is a plan view showing a battery precursor of embodiment 1.
Figure 2:
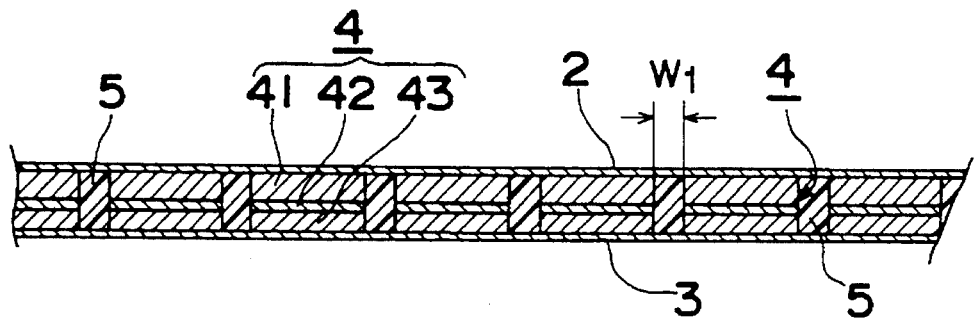
FIG. 2 is a sectional view taken on a line II—II of FIG. 1.

FIG. 1 is a plan view showing a battery precursor of this embodiment. FIG. 2 is a sectional view taken on a line II—II of FIG. 1. In a battery precursor 1, a large number of battery elements 4 are installed in parallel, in a state where they are partitioned with respect to each other and sealed by an insulator 5, between a plate-like positive current collector plate 2 and negative current collector plate 3 facing each other. The battery elements 4 are in a state of being connected in parallel with each other. The positive current collector plate 2 and the negative current collector plate 3 are continuous in the entire plane without being interrupted. Namely, both current collector plates 2 and 3 do not include a penetration hole etc. The battery element 4 is composed of a positive active material layer 41, a separator 42 and a negative active material layer 43. The separator 42 is composed of a solid electrolyte. The insulator 5 functions also as an adhesive agent, and is made of polypropylene based resin for example. The insulator 5 is shaped into a checkered pattern and the battery element 4 is shaped into a plane square pattern. A thickness of the battery precursor 1 is about 0.5 mm and a width w1 of the insulator 5 is also about 0.5 mm.

Figure 3:
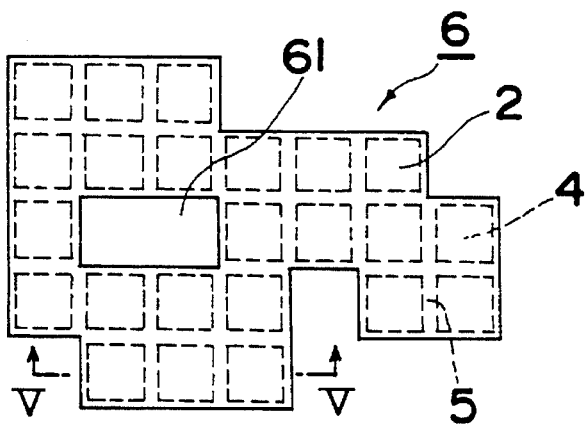
FIG. 3 is a plan view showing a battery of embodiment 2.

FIG. 3 is a plan view showing a battery obtained from the battery precursor 1. This battery 6 has a shape including in its inside a penetration hole 61. The battery 6 having such a shape can be obtained by cutting the battery precursor 1 along a solid line A scribed on the insulator 5. This cutting work is done by using laser beam, thomson blade, ultrasonic wave, punching or wire cutting.

Figure 5:
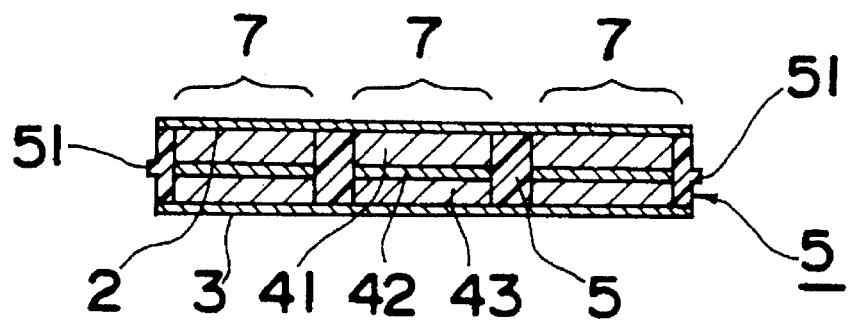
FIG. 5 is a sectional view taken on a line V—V of FIG. 3.

FIG. 5 is a sectional view taken on a line V—V of FIG. 3. The insulator 5 has a projecting section at its cut end. Namely, the insulator 5 has a projection 51. In order to form the insulator 5 having the projection 51, a method may be used wherein the laser beam is irradiated from both upside and downside of the battery precursor 1 or the insulator 5 is heated and applied pressure again after being cut.

According to the battery precursor 1 having the above structure, the following effects can be obtained. (1) A battery having a voluntary shape can be obtained by cutting only. For instance, a battery having a shape enabling installation of an electronic component in the penetration hole 61 i.e. a battery having a shape which permits it to be installed surroundedly around an electronic component as in case of the battery 6 of FIG. 3, can be obtained easily. Therefore, a battery having a shape adapted to demand for each equipment can be obtained inexpensively. (2) Since batteries having various shapes can be obtained from the battery precursor 1 of the same structure, a change of production process of the battery precursor 1 is not necessary and use of metal molds adapted to various shapes are also unnecessary even when obtaining a battery of any shape. Consequently, a production cost of the battery can be reduced by a large margin.

Figure 4:
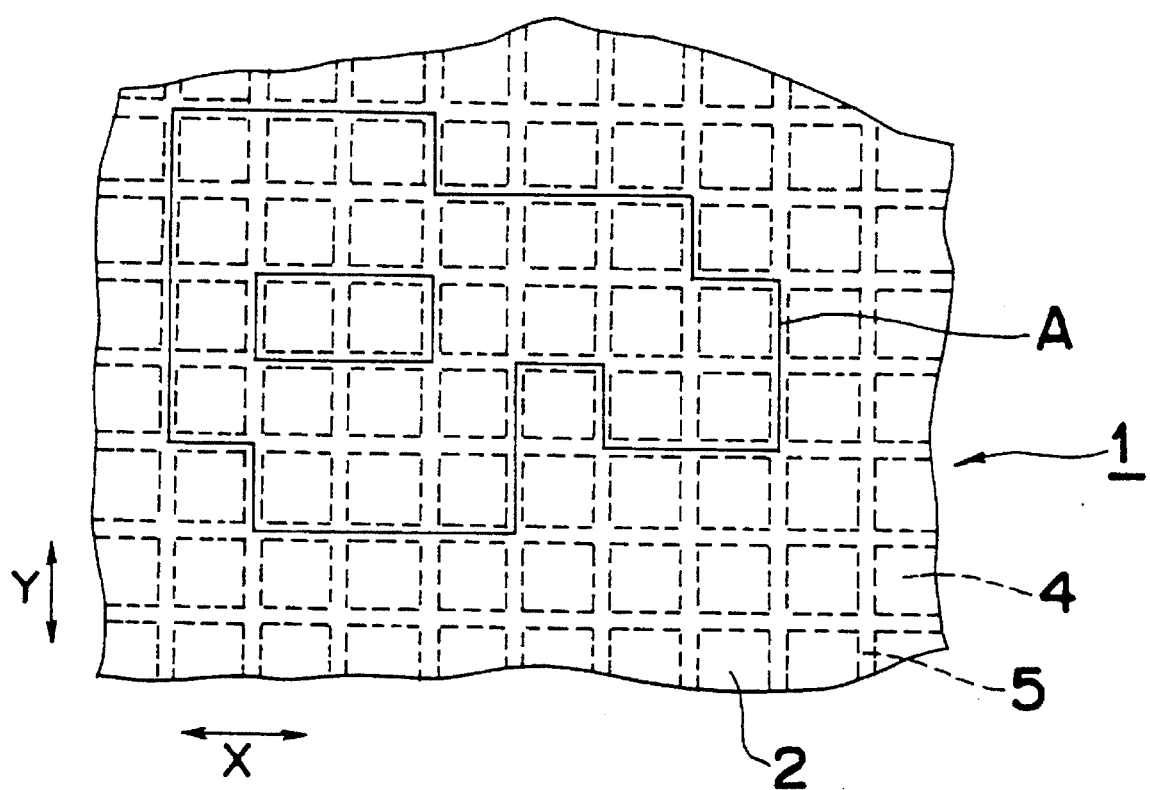
FIG. 4 is a plan view showing the battery precursor of embodiment 1 on which a cut line is drawn in order to obtain the battery of embodiment 2.

(3) As seen from FIG. 4, a part other than that becoming the battery 6 can also be utilized for obtaining a battery having another shape. Therefore, a loss of material eliminated practically so that a yield can be improved and the production cost can be reduced from this point too.

Figure 6:
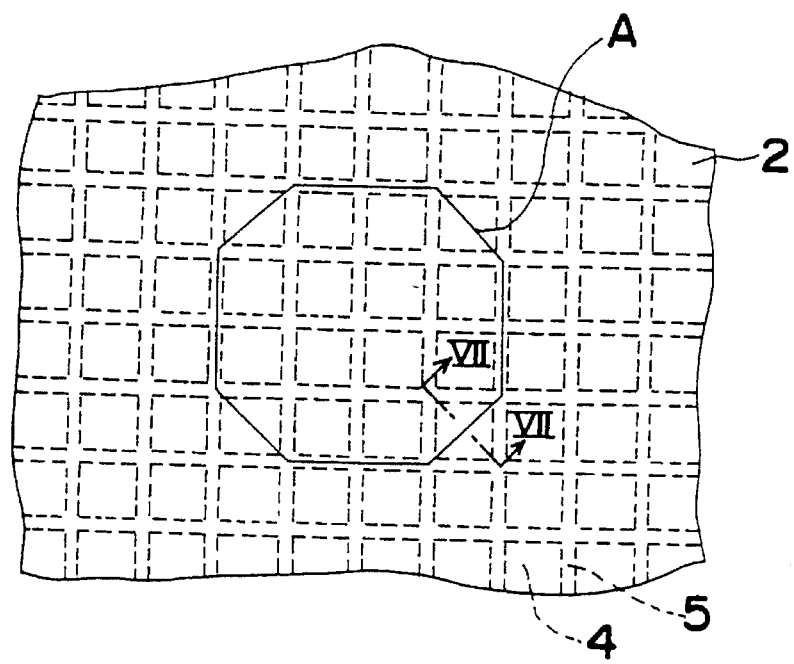
FIG. 6 is a plan view showing an example of deformation of a cut line in the battery precursor of embodiment 1.
Figure 7:
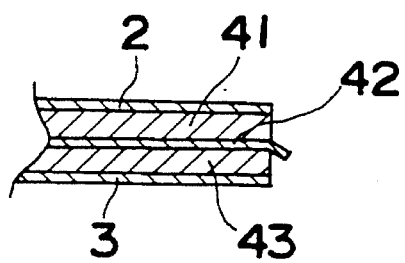
FIG. 7 is a view corresponding to a section taken on a line VII—VII of FIG. 6.

(4) Since the solid electrolyte is used for the electrolyte and the solid electrolyte serves also as the separator, the electrolyte does not leak and an environment is not affected even when the battery precursor 1 is cut at a part other than the insulator 5. For instance, there is a case where the cutting is done along the solid line A as shown by FIG. 6. FIG. 7 is a view corresponding to a section VII—VII of a battery obtained by cutting in FIG. 6.

(5) Since the battery precursor 1 has a thickness of about 0.5 mm i.e. smaller than 5 mm incl. and the insulator 5 has a width w1 of about 0.5 mm i.e. smaller than 3 mm incl., a fraction defective of battery portion is obtained by cutting which is so small as to be negligible. When the insulator 5 has a width w1 of larger than 3 mm, a volume occupied by the battery element 4 becomes small to cause a decrease in battery capacity efficiency. When the battery precursor 1 has a thickness of larger than 5 mm with a width w1 of smaller than 3 mm incl., a cutting accuracy is decreased and a deformation of the insulator 5 is produced when it is cut, so that a defective portion of the obtained battery becomes larger than about 5.7% incl. which can not be overlooked. When the battery precursor 1 has a thickness of smaller than 5 mm incl., the defective becomes smaller than 1.2% incl. which is so small as to be negligible.

(6) Since the battery portion precursor 1 has a thickness of about 0.5 mm i.e. smaller than 1.0 mm incl., the thermal deformation of peripheral part of the cut portion due to preheating can be prevented in case of cutting by using laser beam. That is, it is required to increase an output for melting the both current collector plates 2 and 3 and the insulator 5, so that the peripheral part is thermally deformed due to preheating when the thickness is larger than 1.0 mm. The peripheral part is slightly discolored and no hindrance takes place in the battery when the thickness is smaller than 1.0 mm incl. When the thickness of the battery precursor 1 lies within a range of 0.1 to 0.5 mm, a cutting speed can be increased further.

Figure 8:
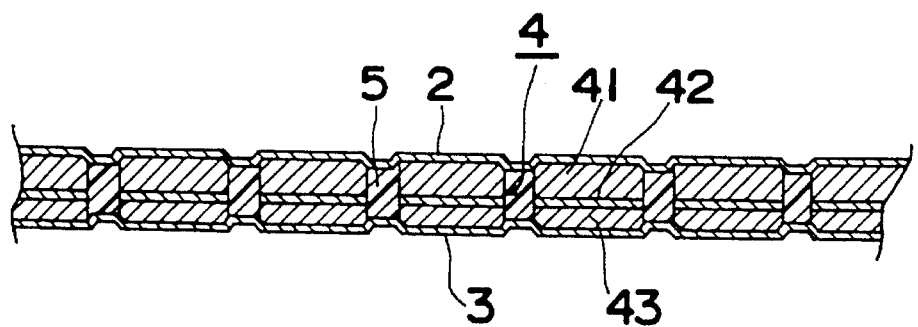
FIG. 8 is a sectional view showing an example of deformation of the battery precursor of embodiment 1.

A material deformable by pressure can be used for the insulator 5. According to this method, portions of the both current collector plates 2 and 3 contacting with the insulator 5 can be recessed as shown by FIG. 8, a position of the insulator 5 to be cut can be known clearly, and a battery having a desired shape can be obtained securely.

(Embodiment 2)

This embodiment relates to a battery obtained from the battery precursor 1 of embodiment 1.

FIG. 3 is a plan view showing a battery 6 of this embodiment. FIG. 5 is a sectional view taken on a line V—V of FIG. 3. The battery 6 is constructed by integrating plural unit batteries 7. The unit battery 7 is constructed in such a way that the battery element 4 is sandwiched between the both current collector plates 2 and 3 and surrounded and sealed by the insulator 5. In the battery 6, the unit batteries 7 are so integrated in a plane as to be connected in parallel in a direction to form the penetrating hole 61.

According to the battery 6 having the above structure, the following effects can be obtained.

(1) Since the penetration hole 61 is provided, an electronic equipment can be installed in this space. Namely, the battery 6 can be so installed as to surround the electronic equipment. Therefore, it can be installed without creating a dead space in an electronic circuit portion so that it can contribute to minimization of the electronic equipment.

(2) The battery is composed of many unit batteries 7 and each battery element 4 is surrounded and sealed by the insulator 5. For this reason, an air-tightness of the battery element 4 located inside is maintained by the insulator 5 and the battery elements 4 located at peripheral parts, so that the air-tightness is 3.6 times better than that of a conventional battery having the same shape and dimension and comprising one battery element only.

(3) Since the battery is formed into a plate shape, it can be installed on a printed substrate easily.

(4) Since a projection 51 is formed on the insulator 5 as shown in FIG. 5, an electric short-circuiting caused by contact between the both current collector plates 2 and 3 can be prevented. In addition, a worker can be protected from being damaged by edges of the both current collector plates 2 and 3.

(5) Since peripheral edges are surrounded by the insulator 5, there is no chance for a component material of the battery element 4 to leak outside.

The shape of battery obtained from the battery precursor 1 of embodiment 1 is not limited to the shape of the battery 6.

(Embodiment 3)

This embodiment relates to a method for manufacturing the battery 6, for example, from the battery precursor 1 of embodiment 1. The method of this embodiment is one for cutting the battery precursor 1 by using laser beam.

An output and irradiation direction of the laser beam are controlled by a computer. Information input to the computer control part is done by a key board or an external circuit. As a laser beam source, at least two sources: for width direction (X-direction in FIG. 4) and for longitudinal direction (Y-direction in FIG. 4) are provided. Cutting of the battery precursor 1 is done by moving the laser beam source so that the laser beam can be irradiated along the solid line A of FIG. 4. The movement of laser beam may be done by fixing the laser beam to an X-Y axis drive robot etc. and moving the robot by computer control. The battery precursor 1 may be moved during the cutting work.

According to the above method, the following functions and effects can be obtained.

(1) Burrs causing an electric short-circuiting might be formed on the both current collector plates 2 and 3 in case when cutting the battery precursor 1 by machining. However, since the method of this embodiment provides the cutting using the laser beam, the battery precursor 1 can be cut in an non-contact way. For this reason, a battery scarcely causing the electric short-circuiting can be obtained without forming burrs.

(2) Since the output and irradiation direction can be changed voluntarily, the projection 51 can be formed on the insulator 5 by irradiating the laser beam from both upside and downside with an appropriate output.

(3) Owing to the computer control, cutting for obtaining batteries of various shapes can be done correctly, and a change of cutting adapted to various shapes can be done quickly.

(4) Since the laser beams for at least the width direction and longitudinal direction are provided, a work efficiency of cutting can be improved and a productivity of battery can be increased. The productivity can be increased further when the battery precursor 1 is also moved.

(Embodiment 4)

This embodiment relates to a battery precursor.

Figure 9:
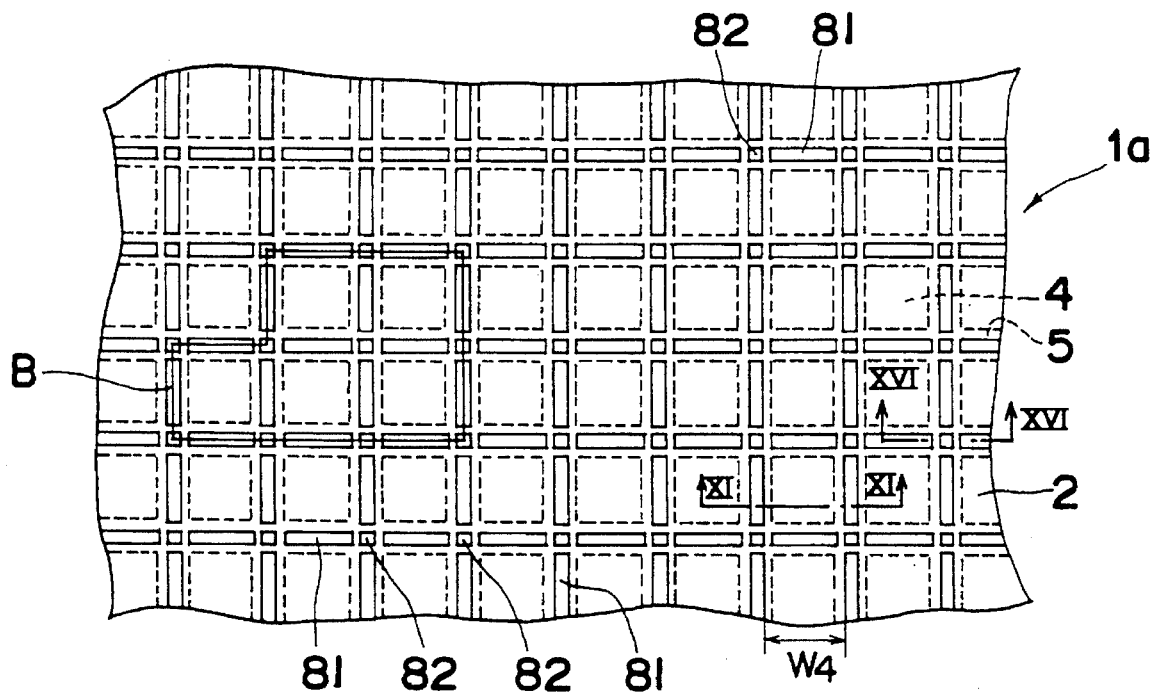
FIG. 9 is a plan view showing a battery precursor of embodiment 4.
Figure 10:
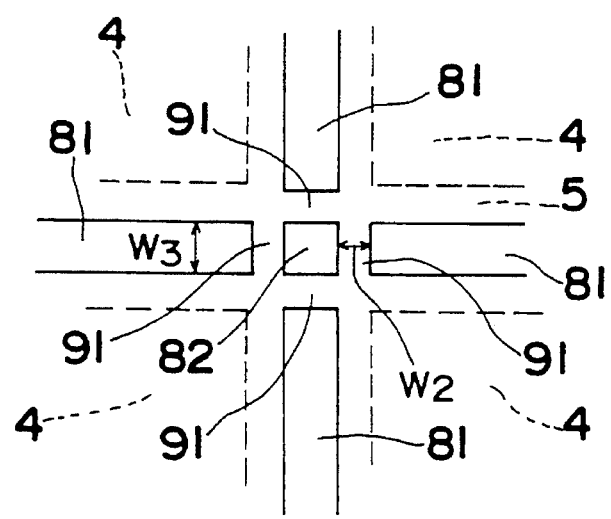
FIG. 10 is a partially enlarged view of FIG. 9.
Figure 11:
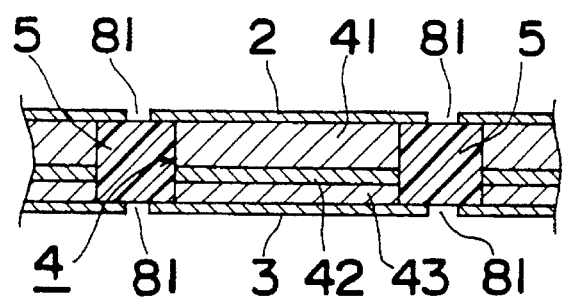
FIG. 11 is a sectional view taken on a line XI—XI of FIG. 9.

FIG. 9 is a plan view showing a battery precursor 1a of this embodiment. FIG. 10 is a partially enlarged view of FIG 9. FIG. 11 is a sectional view taken on a line XI—XI of FIG. 9. In these figures, symbols same with those of the battery precursor 1 of embodiment 1 represent the same or corresponding components. The battery precursor 1a of this embodiment is different from the battery precursor 1 of embodiment 1 in a point that many penetration portions 81 and 82 are formed on the both current collector plates 2 and 3, and the other points are identical.

In the positive current collector plate 2, the penetration portion 81 is formed longwise at a part between the adjoining battery elements 4, the penetration portion 82 is formed at a part between the obliquely adjoining battery elements 4, and a narrowed portion 91 is left between the penetration portion 81 and the penetration portion 82. That is, the adjoining battery elements 4 are connected each other on a positive side through the narrowed portion 91 of the positive current collector plate 2. A width w2 of the narrowed portion 91 is 0.8 mm and a width w3 of the penetration portion 81 is 1.0 mm. A side dimension w4 of the square positive current collector plate 2 partitioned by the penetration portions 81 and 82 is about 10 mm. The penetration portions 81 and 82 are formed in the same way even in the negative current collector plate 3, and the adjoining battery elements 4 are connected each other on a negative side through a narrowed portion (same with the narrowed portion 91) of the negative current collector plate 3. A thickness of the current collector plates 2 and 3 is about 20 μm.

Figure 12:
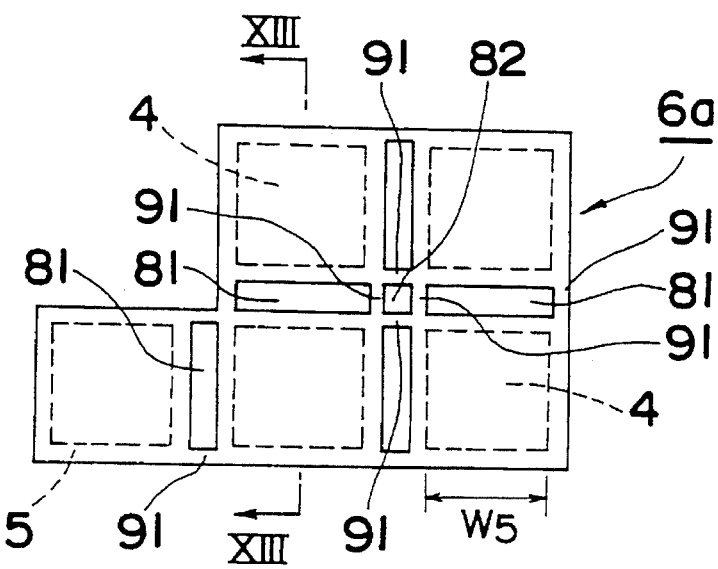
FIG. 12 is a plan view showing a battery of embodiment 5.
Figure 13:
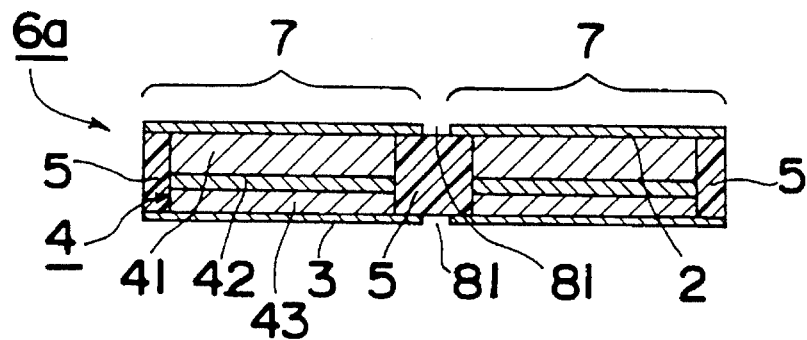
FIG. 13 is a sectional view taken on a line XIII—XIII of FIG. 12.

FIG. 12 is a plan view showing a battery obtained from the battery precursor 1a. FIG. 13 is a sectional view taken on a line XIII—XIII of FIG. 12. This battery 6a is one having five battery elements 4 and obtained by cutting the battery precursor 1a at a solid line B scribed on the insulator 5 as shown by FIG. 9. This cutting work is done by using laser beam, thomson blade, ultrasonic wave, punching or wire cutting.

According to the battery precursor 1a having the above structure, the following functions and effects can be obtained.

(1) It is enough to cut the both current collector plates 2 and 3 only at the narrowed portion 91 in order to cut the battery precursor 1a, so that the cutting becomes simple. In addition, an electric output is small when the laser beam, ultrasonic wave or wire cutting is used, so that the production cost can be reduced.

(2) Since the width w2 of the narrowed portion 91 is 0.8 mm i.e. smaller than 1.0 mm incl., the thermal deformation of the peripheral part of cut portion due to preheating can be prevented when the cutting is done by using the laser beam. In other words, when the width is larger than 1.0 mm, it is required to increase the output for molten cutting of the narrowed portion 91 so that the peripheral part of the narrowed portion 91 is thermally deformed due to preheating. Further, since a molten cutting length is long, the production speed is reduced. Moreover, molten cut metal remains into a mass to cause an electric short-circuiting of the obtained battery. Since the width w2 of the narrowed portion 91 is larger than 0.2 mm incl., the narrowed portion 91 can be left securely without cutting it off by forming the penetration portions 81 and 82 at time of work for leaving the narrowed portion 91.

(3) The width w3 of the penetration portion 81 is 1.0 mm, that is; it lies within a range from 0.1 mm incl. to 1.0 mm incl. Therefore, an electric short-circuiting through the machine facility at time of cutting by machining can be prevented and the battery capacity efficiency can be prevented from lowering. Namely, a width smaller than 0.1 mm will cause an electric short-circuiting of the both current collector plates 2 and 3 through the thomson blade, for example, in case of cutting by using the thomson blade. Further, a width larger than 1.0 mm will cause a decrease in volume occupied by the battery element 4 forming an electrochemical reaction portion.

(4) Functions and effects same with the functions and effects (1) to (4) of the battery precursor 1 of embodiment 1 can be obtained.

(Embodiment 5)

This embodiment relates to a battery obtained from the battery precursor 1a of embodiment 4.

FIG. 12 is a plan view showing a battery 6a of this embodiment. FIG. 13 is a sectional view taken on a line XIII—XIII of FIG. 12. The battery 6a is constructed by integrating plural unit batteries 7 in the same way as the battery 6 of embodiment 2. Adjoining unit batteries 7 are connected each other through the narrowed portion 91. The narrowed portion 91 has a dimension w2 of 0.8 mm and a dimension w3 of 1.0 mm.

According to the battery 6a having the above structure, the following functions and effects can be obtained. (1) Since the narrowed portion 91 has the specified dimensions, it functions as a fuse. Therefore, in the event when abnormal states occur, a damage can be controlled to a minimum by cutting away an abnormal battery element 4. That is, when w2 is smaller than 0.2 mm, the narrowed portion 91 is easily molten cut by an ordinary current so as not to function as a fuse. When w3 is larger than 1.0 mm, the decrease in battery capacity efficiency becomes remarkable as described above.

(2) Since bending at the narrowed portion 91 becomes possible, flexibility of the entire battery 6a is improved.

(3) The battery can be installed in a small excessive space of the electronic circuit, it can contribute to minimization of the electronic equipment.

(4) Functions and effects same with the functions and effects (2), (3) and (5) of the battery 6 of embodiment 2 can be obtained.

(Embodiment 6)

This embodiment relates to a method for manufacturing the battery 6a, for example, from the battery precursor 1a of embodiment 4.

The method of this embodiment is characterized in that the narrowed portions 91 of the both current collector plates 2 and 3 are molten cut by using the laser beam and then the insulator 5 is cut by machining using the thomson blade for example.

Figure 14:
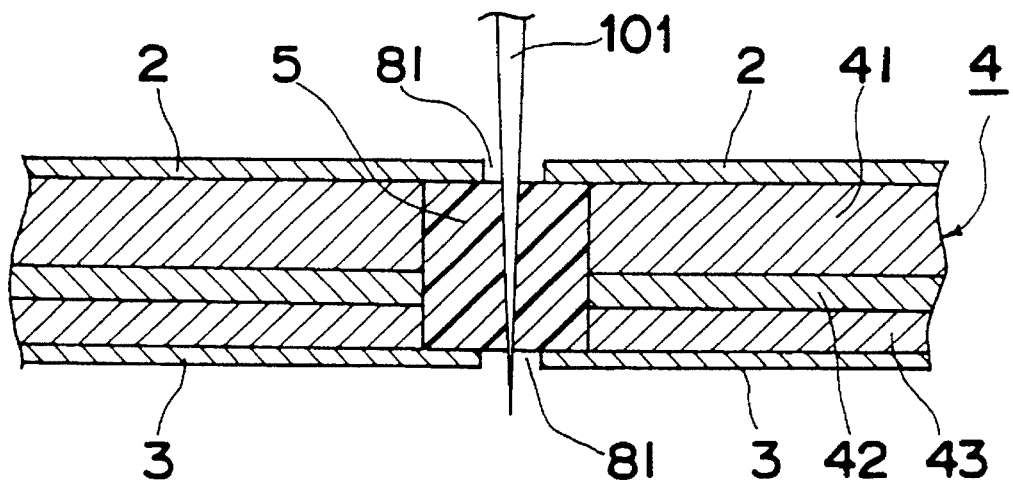
FIG. 14 is a sectional view showing one process of a method of embodiment 6.

After completion of molten cutting of the narrowed portion 91, there is no possibility that a thomson blade 101 contacts with the both current collector plates 2 and 3 when cutting the insulator 5 by using the thomson blade 101 as shown in FIG. 14. Therefore, there is no chance for the both current collector plates 2 and 3 to contact electrically each other through the thomson blade 101 at time of cutting, so that the electric short-circuiting does not occur. Burrs are not formed on the both current collector plates 2 and 3 of the obtained battery and the electric short-circuiting caused by the burr does not occur, too.

(Embodiment 7)

This embodiment relates to a method for manufacturing the battery precursor 1a of embodiment 4.

Figure 15:
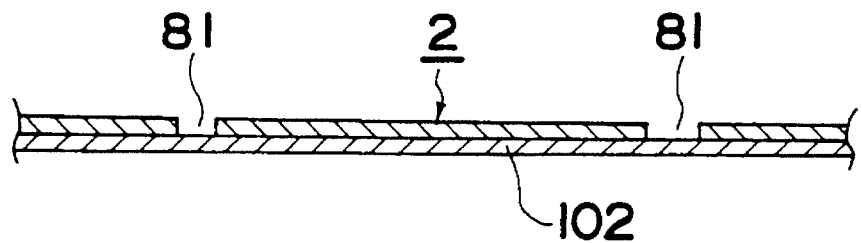
FIG. 15 is a view showing one process of a method of embodiment 7 and corresponding to a section taken on a line XI—XI of FIG. 9.
Figure 16:
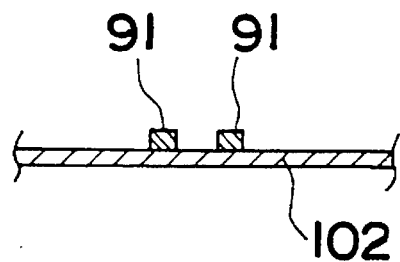
FIG. 16 is a view showing one process of a method of embodiment 7 and corresponding to a section taken on a line XVI—XVI of FIG. 9.
Figure 17:
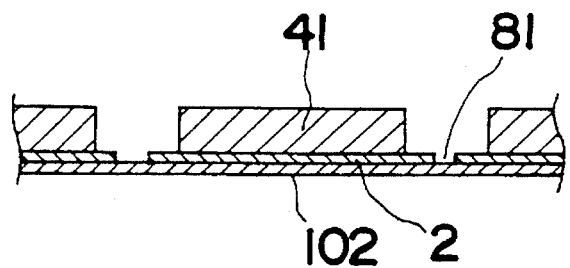
FIG. 17 and FIG. 18 are sectional views showing one processes of the method of embodiment 7 respectively.
Figure 18:
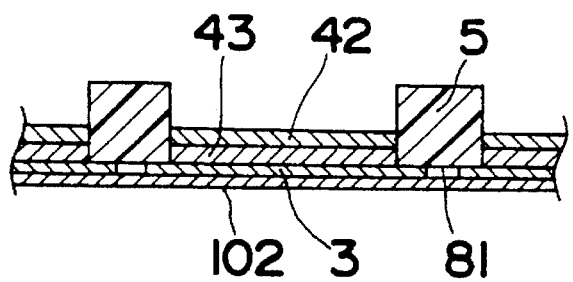

In the first place, a resin film 102 is bonded to one surface of the positive current collector plate 2 in which the penetration portions 81 and 82 are formed, as shown by FIG. 15 and FIG. 16. Thereby, the entire positive current collector plate 2 including the narrowed portion 91 are reinforced. FIG. 15 corresponds to a section XI—XI of FIG. 9 and FIG. 16 corresponds to a section XVI—XVI of FIG. 9. In the next place, the positive active material is printed by means of a metal mask system on a surface opposite to the resin film 102 of the positive current collector plate 2 within a range on which the battery element 4 is formed, it is then dried and cured by electron beam to form a positive active material layer 41 having a thickness of about 0.25 mm. FIG. 17 is a sectional view showing the positive current collector plate 2 having the positive active material layer 41. A side dimension w5 (FIG. 12) of the battery element 4 is about 8 mm. While, the resin film 102 is bonded also to one surface of the negative current collector plate 3 on which the penetration portions 81 and 82 are formed, in the same way as the positive current collector plate 2. The negative active material is transferred onto a surface opposite to the resin film 102 of the negative current collector plate 3 within a range on which the battery element 4 is formed, so as to form a negative active material layer 43. Polymer solid electrolyte is further printed on it by means of metal mask system, dried and then cured by electron beam to form a separator 42 having a thickness of about 0.02 mm. In the third place, an insulator comprising an adhesive agent is thermally bonded no the negative current collector plate 3 within a range where the negative active material layer 43 and the separator 42 do not exist, so that the insulator 5 is formed. FIG. 18 is a sectional view showing the negative current collector plate 3 having the negative active material layer 43, the separator 42 and the insulator 5. The positive current collector plate 2 shown in FIG. 17 and the negative current collector plate 3 shown in FIG. 18 are laid one upon another, the insulator 5 is thermally bonded to the positive current collector plate 2 to obtain the battery precursor 1a. Thereafter, the resin film 102 may be peeled off or may not be peeled off. In case when it is not peeled off, a name of battery etc. is previously printed on it for serving as an outer package film.

According to the above method, the battery element 4 is formed under a state where the both current collector plates 2 and 3 which are increased their flexibility owing to formation of the penetration portions 81 and 82, are reinforced by the resin film 102, so that the battery element 4 can be formed correctly and securely. In addition, since winding and rewinding of the both current collector plates 2 and 3 become possible, they can be sent to the next process by Roll-to-Roll system and continuous working after that becomes possible.

(Embodiment 8)

This embodiment relates to a method for manufacturing the battery precursor 1a of embodiment 4.

Figure 19:
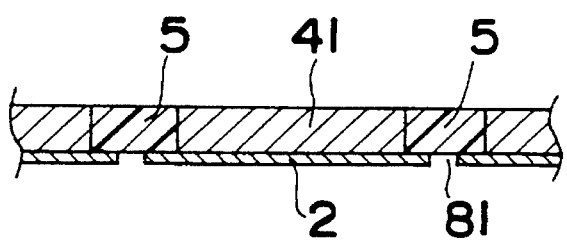
FIG. 19 and FIG. 20 are sectional views showing one processes of a method of embodiment 8 respectively.
Figure 20:
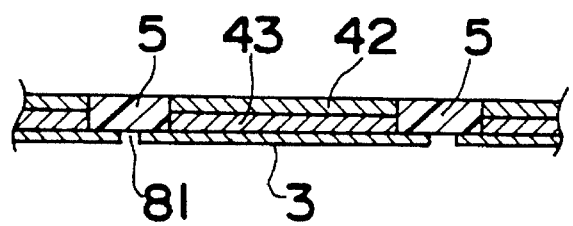

In the method of this embodiment, the both current collector plates 2 and 3 are reinforced respectively by previously forming the insulator 5 so as to eliminate the resin film 102. Namely, the insulator 5 is formed on one surface of the positive current collector plate 2 and the positive active material layer 41 is then formed, as shown in FIG. 19. While, the insulator 5 is formed on one surface of the negative current collector plate 3 and the negative active material layer 43 and the separator 42 are then formed in order, as shown in FIG. 20. Thereafter, the both current collector plates 2 and 3 are integrated by thermally bonding the insulators 5 each other so as to obtain the battery precursor 1a.

Since the battery element 4 is formed in a state where the both current collector plates 2 and 3 are reinforced even by the above method, functions and effects same with those of the embodiment 7 can be obtained.

(Embodiment 9)

This embodiment relates to a battery precursor.

Figure 21:
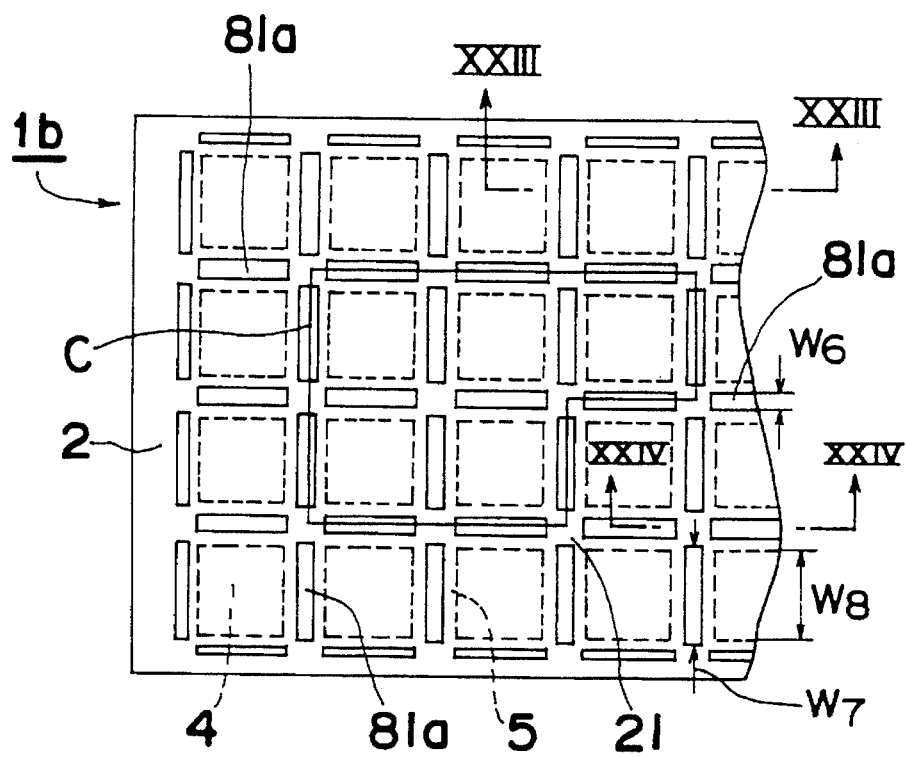
FIG. 21 is a plan view showing a battery precursor of embodiment 9.
Figure 22:
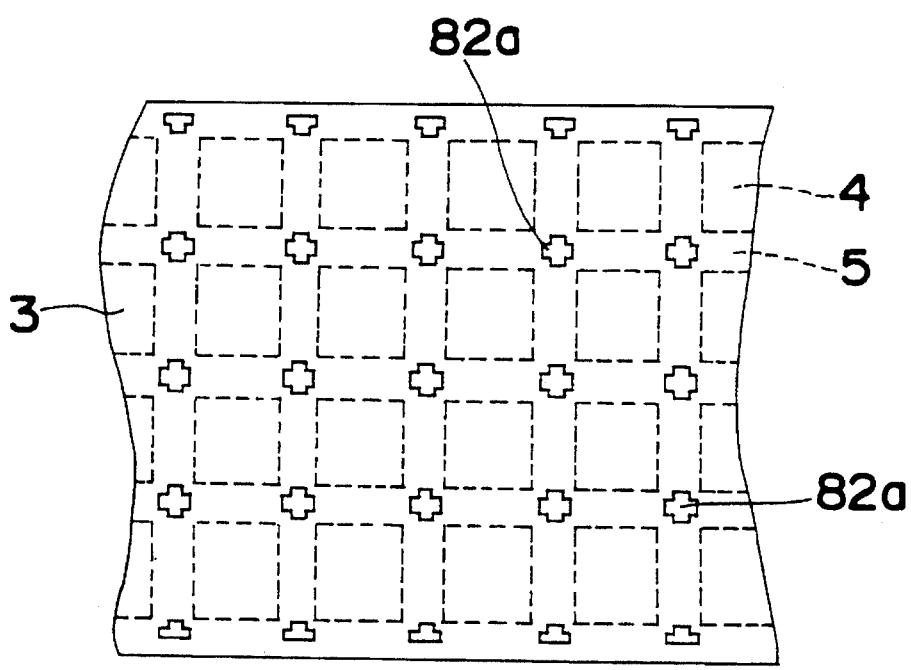
FIG. 22 is a bottom view of the same.
Figure 23:
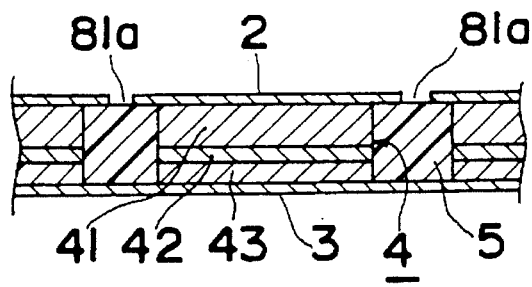
FIG. 23 is a sectional view taken on a line XXIII—XXIII of FIG. 21.
Figure 24:
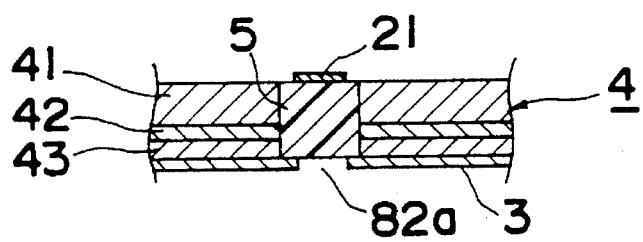
FIG. 24 is a sectional view taken on a line XXIV—XXIV of FIG. 21.

FIG. 21 is a plan view showing a battery precursor of this embodiment. FIG. 22 is a bottom view of the same. FIG. 23 is a sectional view taken on a line XXIII—XXIII of FIG. 21. FIG. 24 is a sectional view taken on a line XXIV—XXIV of FIG. 21. In these figures, symbols same with those of the battery precursor 1 of embodiment 1 represent the same or corresponding components. The battery precursor 1b of this embodiment is different from the battery precursor 1 of embodiment 1 in a point that the penetration portion 81a is formed on the positive current collector plate 2 and the penetration portion 82a is formed on the negative current collector plate 3, and the other points are identical.

In the positive current collector plate 2, the penetration portion 81a is formed longwise at a part between the adjoining battery elements 4. In the negative current collector plate 3, the penetration portion 82a is formed at a part between the obliquely adjoining battery elements 4. The penetration portion 81a faces on a portion of the negative current collector plate 3 where the penetration portion 82a does not exist, and the penetration portion 82a faces on a portion of the positive current collector plate 2 where the penetration portion 81a does not exist. A thickness of the positive current collector plate 2 is about 10 μm. In FIG. 21, a width w6 of the penetration portion 81a is about 1 mm, a length w7 of the penetration portion 81a is about 10 mm, and a side dimension w8 of the battery element 4 is about 8 mm. In the positive current collector plate 2, a part 21 surrounded by ends of four penetration portions 81a is of about 2 mm square. The penetration portion 82a has an approximately cross shape of about 2.5 mm square.

Figure 25:
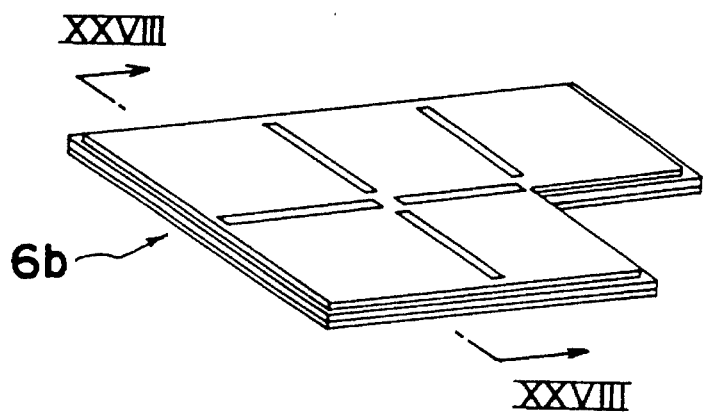
FIG. 25 is an oblique view showing a battery of embodiment 10.

FIG. 25 is an oblique view showing a battery 6b obtained from the battery precursor 1b. This battery 6b is one having five battery elements 4 and obtained by cutting the battery precursor 1b along a solid line C scribed on the insulator 5 as shown by FIG. 21. This cutting work is done by using for example; laser beam, thomson blade, ultrasonic wave, punching or wire cutting.

According to the battery precursor 1b having the above structure, the following functions and effects can be obtained.

(1) Concerning the both current collector plates 2 and 3, the cutting at the penetration portions 81a and 82a can be eliminated when cutting the battery precursor 1b, so that the cutting becomes simple. In addition, an electric output is small when using the laser beam, ultrasonic wave or wire cutting so that the production cost can be reduced.

Figure 26:
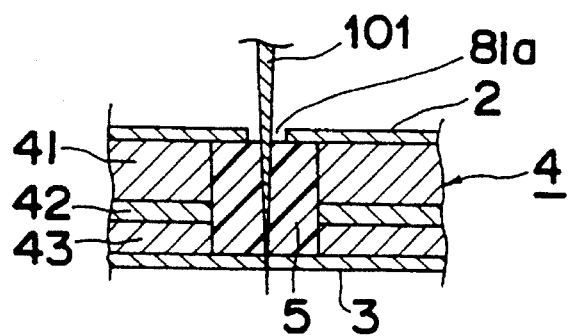
FIG. 26 and FIG. 27 are sectional views showing cutting processes of the battery precursor of embodiment 9 respectively.
Figure 27:
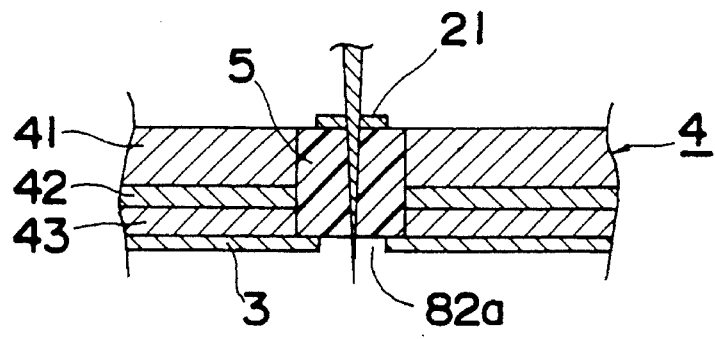

(2) When the cutting is done by machining by the use of the thomson blade 101, for example, the thomson blade 101 does not contact with the positive current collector plate 2 because it lies within the penetration portion 81a when contacting with the negative current collector plate 3 as shown by FIG. 26, and it does not contact with the negative current collector plate 3 because it lies within the penetration portion 82a when contacting with the positive current collector plate 2 (part 21) as shown by FIG. 27. In other words, since there is no chance for the thomson blade 101 to be in contact with the both current collector plates 2 and 3 simultaneously at time of the cutting, an electric short-circuiting caused by the contact between the both current collector plates 2 and 3 through the thomson blade 101 does not take place.

(3) Functions and effects same with those of the functions and effects (1) to (4) of the battery precursor 1 of embodiment 1 can be obtained.

(Embodiment 10)

This embodiment relates to a battery obtained from the battery precursor 1b of embodiment 9.

Figure 28:
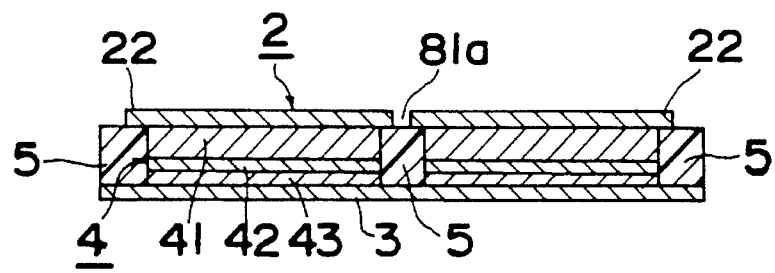
FIG. 28 is a sectional view taken on a line XXVIII—XXVIII of FIG. 25.

FIG. 25 is an oblique view showing a battery 6b of this embodiment. FIG. 28 is a sectional view taken on a line XXVIII—XXVIII of FIG. 25. The battery 6b is constructed by integrating plural unit batteries 7 in the same way as the battery 6 of embodiment 2.

In the battery 6b, since a cut end 22 of the positive current collector plate 2 is located at an inside of a cut end of the insulator 5, the both current collector plates 2 and 3 are positively prevented from contacting each other beyond the insulator 5. Namely, an electric short-circuiting is prevented securely. Other functions and effects are same with those of the battery 6a of embodiment 5.

(Embodiment 11)

This embodiment relates to a method for manufacturing the battery 6b, for example, from the battery precursor 1b of embodiment 9.

The battery 6b can be obtained by cutting the battery precursor 1b along the solid line C shown by FIG. 21 through the use of laser beam, thomson blade, ultrasonic wave, punching or wire cutting. In this instance, the following functions and effects can be obtained.

(1) Concerning the both current collector plates 2 and 3, the cutting at the penetration portions 81a and 82a can be eliminated so that the cutting becomes simple. In addition, an electric output is small when using the laser beam, ultrasonic wave or wire cutting so that the production cost can be reduced.

(2) When the cutting is done by machining by the use of the thomson blade 101, for example, there is no chance for the thomson blade 101 to be in contact with the both current collector plates 2 and 3 simultaneously at time of the cutting as shown by FIG. 26 and FIG. 27. Therefore, an electric short-circuiting caused by contact between the both current collector plates 2 and 3 through the thomson blade 101 does not take place.

(Embodiment 12)

This embodiment relates to a method for manufacturing the battery precursor 1b of embodiment 9.

Figure 29:
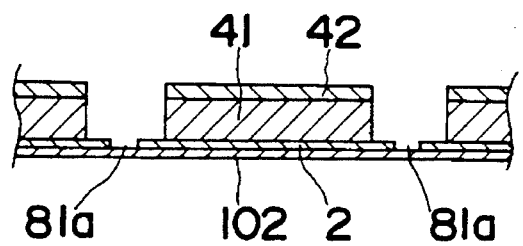
FIG. 29 and FIG. 30 are sectional views showing one processes of a method of embodiment 12 respectively.

In the first place, a resin film 102 is bonded to one surface of the positive current collector plate 2 on which the penetration portion 81a is formed by laser cutting, so as to reinforce the positive current collector plate 2. A thickness of the positive current collector plate 2 is about 10 µm. In the second place, a next process is carried out while continuously supplying the positive current collector plate 2 by the Roll-to-Roll system. The positive active material is pattern printed on a region where the battery element 4 is installed, dried as occasion demands, and then cured by irradiation of electron beam to form the positive active material layer 41. The solid electrolyte is pattern printed on the positive active material layer 41, and cured by irradiation of electron beam to form the separator 42. FIG. 29 shows the positive current collector plate 2 having the positive active material layer 41 and the separator 42.

Figure 30:
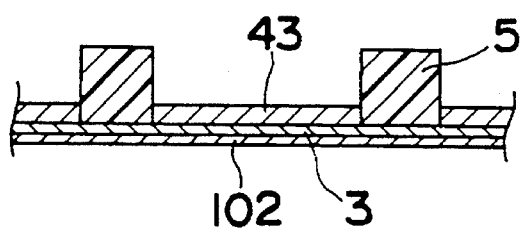

While, the resin film 102 is bonded to one surface of the negative current collector plate 3 on which the penetration portion 82a is formed by punching using press dies, so as to reinforce the negative current collector plate 3. A thickness of the negative current collector plate 3 is about 10 µm. A next process is carried out while continuously supplying the negative current collector plate 3 by the Roll-to-Roll system. The negative active material is placed on a range where the battery element 4 is installed to form the negative active material layer 4B, and the insulator 5 comprising an adhesive agent is placed on a range other than the range where the battery element 4 is installed. FIG. 30 shows the negative current collector plate 3 having the negative active material layer 43 and the insulator 5.

The both current collector plates 2 and 3 are laid one upon another while being roll pressed and the insulator 5 is bonded to the positive current collector plate 2 by means of thermal roll and thermal press, so that the both current collector plates 2 and 3 are integrated to obtain the battery precursor 1b.

(Embodiment 13)

This embodiment relates to a battery precursor.

Figure 31:
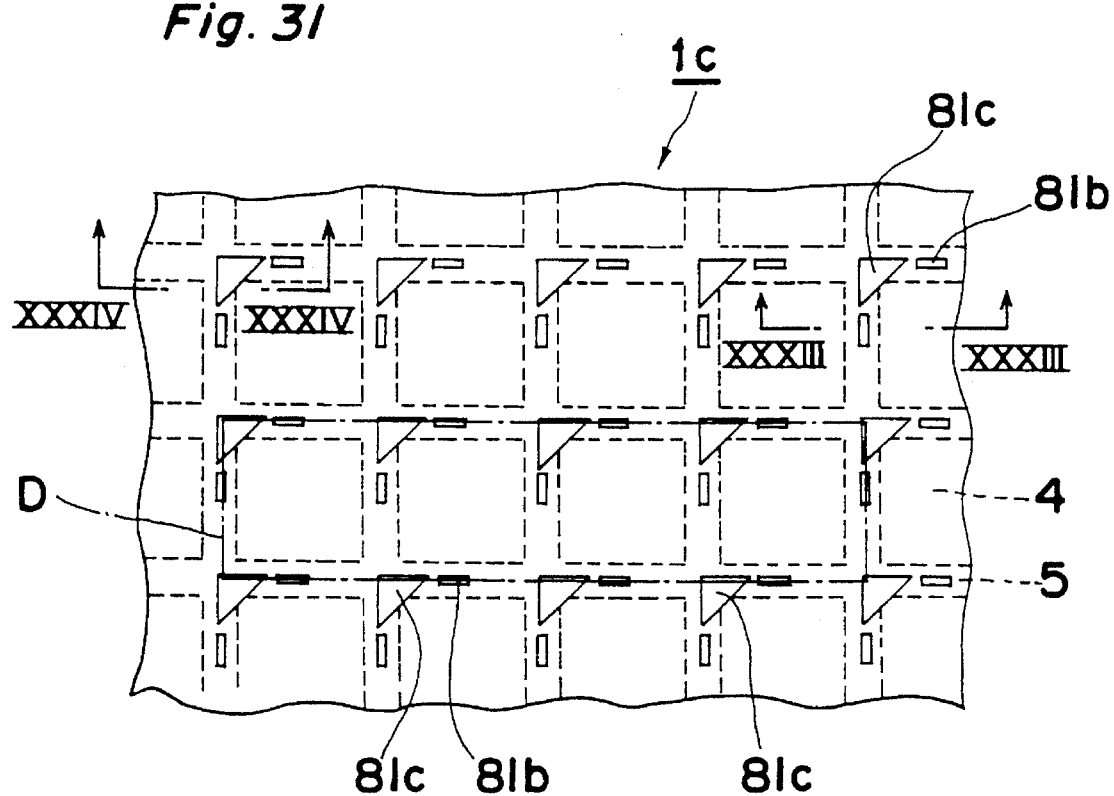
FIG. 31 is a plan view showing a battery precursor of embodiment 13.
Figure 32:
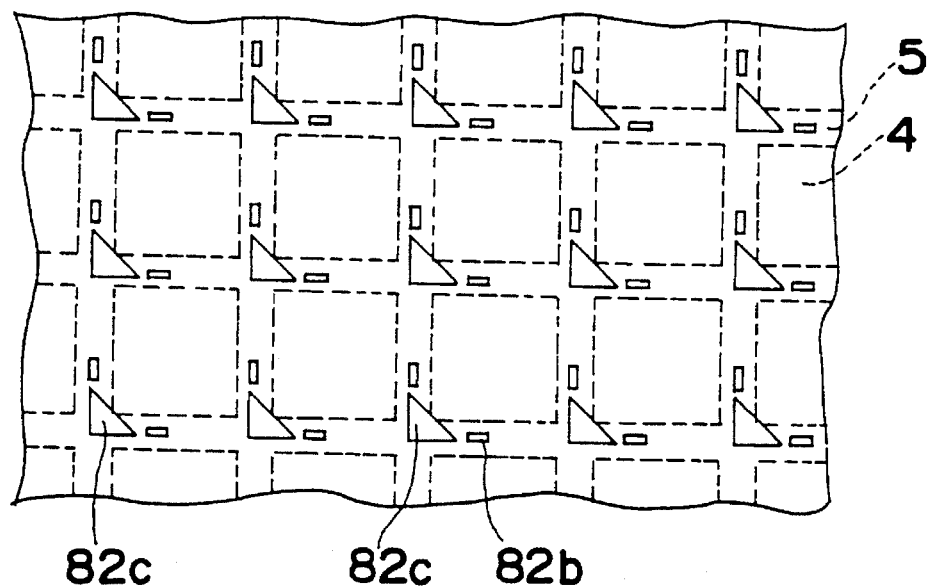
FIG. 32 is a bottom view of the same.
Figure 33:
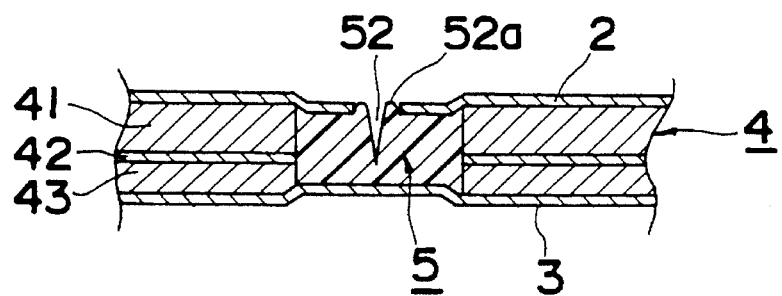
FIG. 33 is a sectional view taken on a line XXXIII—XXXIII of FIG. 31.
Figure 34:
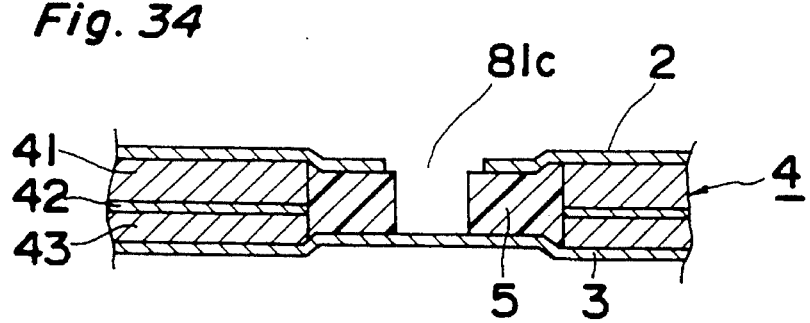
FIG. 34 is a sectional view taken on a line XXXIV—XXXIV of FIG. 31.

FIG. 31 is a plan view showing a battery precursor 1c of this embodiment. FIG. 32 is a bottom view of the same. FIG. 33 is a sectional view taken on a line XXXIII—XXXIII of FIG. 31. FIG. 34 is a sectional view taken on a line XXXIV—XXXIV of FIG. 31. In these figures, symbols same with those of the battery precursor 1 of embodiment 1 represent the same or corresponding components.

In the positive current collector plate 2, a slitted penetration portion 81b is formed on a part between the adjoining battery elements 4, and a recessed portion 52 is formed on a part of the insulator 5 facing to the penetration portion 81b as shown by FIG. 33. The recessed portion 52 has an acute angled bottom formed by cutting-in. A swollen portion 52a installed along an edge of the penetration portion 81b is made on an opening of the recessed portion 52. While, in the negative current collector plate 3, a slitted penetration portion 82b is formed on a part between the adjoining battery elements 4. The penetration portion 81b and the penetration portion 82b are so installed as not to face on each other.

Penetration portions 81c and 82c penetrating even the battery elements 4 are formed on parts of the both current collector plates 2 and 3 contacting with corners of the battery elements 4, and the penetration portion 81c does not face to the penetration portion 82c. The negative current collector plate 3 can be seen from the penetration portion 81c, and the positive current collector plate 2 can be seen from the penetration portion 82c. The both penetration portions 81c and 82c are formed into shapes having triangle cross-sections.

The battery element 4 has dimensions of 18 mm by 11 mm. Thicknesses of the battery precursor 1c, the negative current collector plate 3, the positive active material layer 41, the separator 42 and the negative active material layer 43 are about 0.2 µmm, 20 µm, about 120 µm, about 10 µm and about 30 µm, respectively. A width of the penetration portion 81b is about 0.5 mm.

According to the battery precursor 1c having the above structure, the following functions and effects can be obtained.

Figure 35:
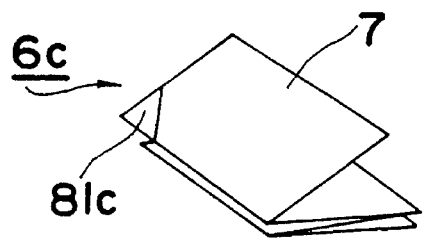
FIG. 35 is an oblique view showing a battery of embodiment 14.
Figure 36:
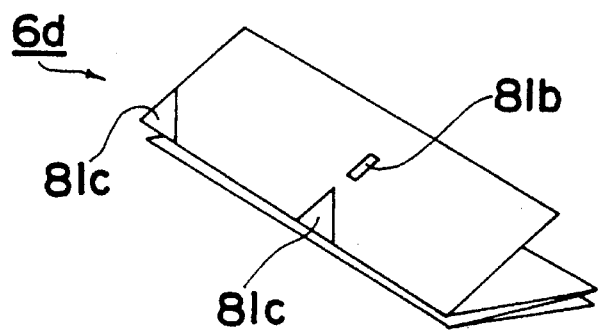
FIG. 36 is an oblique view showing an example of deformation of a battery shown in FIG. 35.

(1) A laminate type battery can be obtained by cutting a battery comprising voluntary number of battery elements 4 away from the battery precursor 1c and bending it at portions of the penetration portions 81b and 82b and the recessed portion 52, as shown by FIG. 35. A battery 6c of FIG. 35 has four battery elements 4. Supposing that one battery element 4 has a capacity of 10 mAh, a laminate type battery of about 40 mAh can be obtained. When the battery is folded each two into four layers as shown in FIG. 36, a battery 6d having double capacity with a thickness same with that of the battery 6c of FIG. 35 can be obtained. Namely, laminate type batteries having various capacities can be obtained easily.

(2) A battery comprising voluntary number of battery elements 4 can be obtained by tearing the battery precursor 1c at positions of the penetration portions 81b and 82b. Namely, the cutting work can be eliminated so that the production efficiency can be made better.

(3) Since the thickness of the battery precursor 1c is about 0.2 mm i.e. smaller than 1 mm incl., the obtained battery can be bent without causing a deformation of the battery element 4. The deformation of the battery element 4 would result in an internal short-circuiting. In this connection, relations between thicknesses of the battery precursor 1c and results of battery disassembly check are listed in Table 1. A sample number is 30 cells for each. In the battery disassembly check, shape changes especially thickness changes, of the positive active material layer 41 were examined at corners i.e. in the vicinity of interface with the insulator 5 of battery elements. In case when the thickness of the battery precursor 1c is smaller than 0.1 mm incl., it is necessary to thin the both current collector plates 2 and 3 and the battery manufacturing cost is increased. This case is not desirable. As understood from Table 1, a preferable thickness of the battery precursor 1c is particularly 0.15 mm to 0.5 mm.

TABLE 1

| Thickness of battery precursor 1c (Mm) | Quantity of shape-changed positive active material layer 41 (cells) | Quantity of battery producing internal short-circuiting (cells) |
| --- | --- | --- |
| 0.1 | 0 | 0 |
| 0.15 | 0 | 0 |
| 0.2 | 0 | 0 |
| 0.3 | 0 | 0 |
| 0.5 | 0 | 0 |
| 0.8 | 2 | 0 |
| 1.0 | 5 | 0 |
| 1.2 | 18 | 5 |
| 1.4 | 27 | 16 |

(4) Since the penetration portions 81b and 82b are formed on the both current collector plates 2 and 3 respectively, deformations of the both current collector plates 2 and 3 are not produced at the bent portions. Further, at the bent portions, adhesion failures of the both current collector plates 2 and 3 with the insulator 5 do not arise too.

(5) Since the penetration portions 81*b* and 82*b* are not facing each other, they are not broken even when they are folded at the portions.

(6) When the recessed portions 52 are formed not only on the positive current collector plate 2 side but also on the negative current collector plate 3 side and further the recessed portions 52 are formed alternatively each other, the shape change at time of bending is reduced still more.

(7) Since the swollen potion 52*a* is formed, the peeling-off of the insulator 5 from the positive current collector plate 2 can be prevented. Electric insulation between the positive current collector plates 2 at both sides of the penetration portion 81*b* can be secured.

(8) A negative terminal can be taken out of the penetration portion 81*c* and a positive terminal can be taken out of the penetration portion 82*c*. Therefore, the terminals can be taken out of the obtained laminated type battery easily.

(9) Functions and effects same with the functions and effects (1) to (4) of the battery precursor 1 of embodiment 1 can be obtained.

(Embodiment 14)

This embodiment relates to a battery obtained from the battery precursor 1*c* of embodiment 13.

FIG. 35 is an oblique view showing a battery 6*c* of this embodiment. The battery 6*c* is same with the battery 6 of embodiment 2 in a point that it is constructed by integrating the plural unit batteries 7, but different from the battery 6 in a point that it is bent and laminated.

According to the battery 6*c*, the following functions and effects can be obtained.

(1) Since this battery has the laminated structure, a plane space for installation can be minimized. For example, it can be housed by being pushed in a clearance of equipment.

(2) Since this battery is bent at portions of the penetration portions 81*b* and 82*b* and the recessed portion 52 of the insulator 5, deformations of the both current collector plates 2 and 3 are not produced at the bent portions. Further, at the bent portions, adhesion failures of the both current collector plates 2 and 3 with the insulator 5 do not arise too.

(3) Since the penetration portions 81*b* and 82*b* are not facing each other, they are not broken at the bent portions.

(4) Since the swollen potion 52*a* is formed, the peeling-off of the insulator 5 from the positive current collector plate 2 can be prevented.

(5) A negative terminal can be taken out of the penetration portion 81*c* and a positive terminal can be taken out of the penetration portion 82*c*. Therefore, the terminals can be taken out easily. In addition, since it is not necessary to connect them by connector terminals, a man-hour can be reduced and an increase in resistance between batteries can be controlled.

(6) The peripheral parts are surrounded by the insulators 5, there is no chance for the component material of the battery element 4 to leak out.

(Embodiment 15)

This embodiment relates to a method for manufacturing the battery 6*c*, for example, from the battery precursor 1*c* of embodiment 13.

The battery 6*c* can be obtained by cutting the battery precursor 1*c* along a dashed line D shown by FIG. 31 through the use of laser beam, thomson blade, ultrasonic wave, punching or wire cutting, for example and by bending it at the penetration portions 81*b* and 82*b* and the recessed portion 52 of the insulator 5. In this instance, the following functions and effects can be obtained. Concerning the both current collector plates 2 and 3, the cutting at the penetration portions 81*b* and 82*b* can be eliminated so that the cutting becomes simple. In addition, an electric output is small when using the laser beam, ultrasonic wave or wire cutting so that the production cost can be reduced.

(Embodiment 16)

This embodiment relates to a method for manufacturing the battery precursor 1*c* of embodiment 13.

Figure 37:
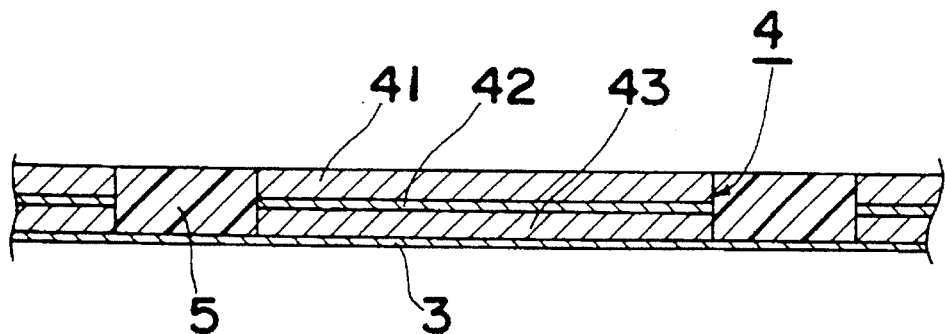
FIG. 37 is a sectional view showing one process of a method of embodiment 16.

In the first place; the negative active material, the solid electrolyte and the positive active material are printed in order on a range where the battery element 4 is installed and on one surface of the negative current collector plate 3 on which the penetration portions 82*b* and 82*c* are formed by a means such as punching etc., so that the negative active material layer 43, the separator 42 and the positive active material layer 41 are formed. The insulator 5 is placed on a range other than that where the battery element 4 is installed. FIG. 37 shows the negative current collector plate 3 having the positive active material layer 41, the separator 42, the negative active material layer 43 and the insulator 5. In the next place, the positive current collector plate 2 subjected to under coat treatment of about 2 μm is laid on the negative current collector plate 3 shown in FIG. 37 and they are bonded to the insulator 5. This bonding work is done by applying pressure to portions of the both current collector plates 2 and 3 facing to the battery elements 4 by using an elastic member having thermal insulation while venting gas, in order not to permit gas to remain inside. The gas venting may be done by rolling before securely bonding the insulator 5 to the positive current collector plate 2. In the third place, the recessed portion 52 is formed on the insulator 5 by making the thomson blade cut in the insulator 5 through the penetration portion 81*b*.

(Embodiment 17)

This embodiment relates to a battery precursor.

Figure 38:
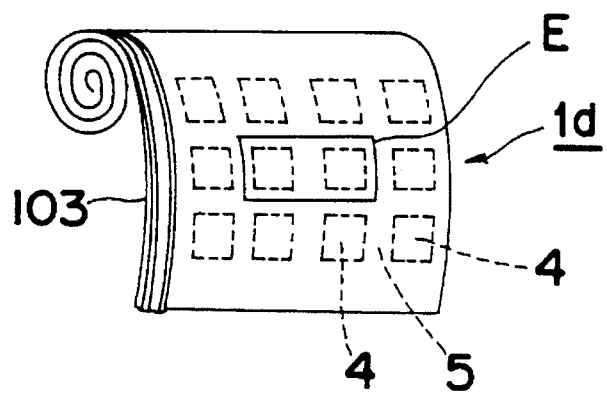
FIG. 38 is an oblique view showing a battery precursor of embodiment 17.
Figure 39:
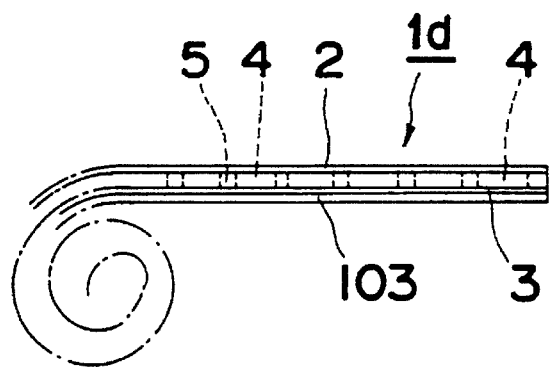
FIG. 39 is a side view of the same.
Figure 40:
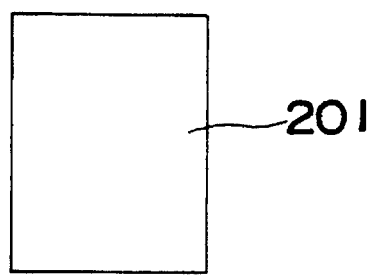
FIG. 40 and FIG. 41 are views showing shapes of conventional batteries respectively.
Figure 41:
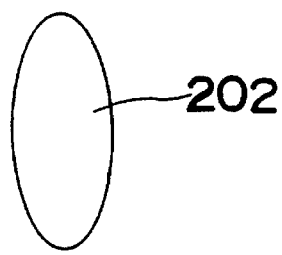
Figure 42:
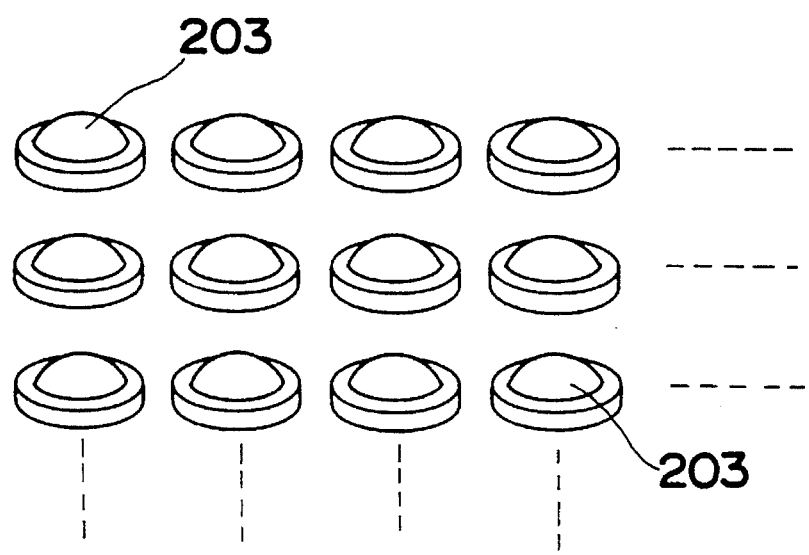
FIG. 42 is an oblique view showing a state where a large number of coin type batteries are manufactured.

FIG. 38 is an oblique view showing a battery precursor 1*d* of this embodiment. FIG. 39 is a side view of the same. In these figures, symbols same with those of the battery precursor 1 of embodiment 1 represent the same or corresponding components. The battery precursor 1*d* of this embodiment is different from the battery precursor 1 of embodiment 1 in a point that a retainer plate 103 is bonded to an outer surface of the negative current collector plate 3, and others points are identical. That is, the battery precursor 1*d* is held by the retainer plate 103.

The retainer plate 103 is a semi-sticky type film, and its adhesive strength is effected by a surface property of film and not by an adhesive agent. Polyvinyl chloride film, for example, is used for the retainer plate 103.

According to the battery precursor 1*d* having the above structure, the following functions and effects can be obtained.

(1) Since the battery obtained by cutting from the battery precursor 1*d* can be held by the retainer plate 103 as it is, the battery can be prevented from being scattered and control and transportation of a large number of manufactured batteries become easy. Since the batteries can be held in an orderly manner so as not to produce external short-circuiting, for example, packaging of it is not troublesome. In addition, the battery can be handled as a scroll.

(2) Since the retainer plate 103 is semi-sticky, the battery obtained by cutting can be taken out as occasion demands.

(3) Since the adhesive strength is effected by the surface property of film and not by the adhesive agent, the taken-out battery is not stained by the retainer plate 103.

(4) When the retainer plate 103 is used as a ground paper, the battery can be obtained by half-cut system.

(Embodiment 18)

This embodiment relates to a method for manufacturing a battery from the battery precursor 1d of embodiment 17.

The method of this embodiment is one in which the battery precursor 1d is cut by the half-cut system along a solid line E of FIG. 38, for example, by using the retainer plate 103 as a ground paper. According to this method, since the batteries obtained by cutting are not scattered, its handling thereafter becomes convenient.

What is claimed is:

1. A battery precursor for producing a battery through a cutting process, in which a large number of battery elements comprising positive active material layers, separators having electrolytes and negative active material layers are installed in parallel under a state of parallel connection between a plate-like positive current collector plate and a negative current collector plate facing each other, and the respective battery elements are partitioned with respect to each other and sealed by insulators.

2. A battery precursor for producing a battery through a cutting process, in which a large number of battery elements comprising positive active material layers, separators having electrolytes and negative active material layers are installed in parallel under a state of parallel connection between a plate-like positive current collector plate and a negative current collector plate facing each other, and the respective battery elements are partitioned with respect to each other and sealed by insulators, and said respective current collector plates are continuous without being interrupted.

3. A battery precursor for producing a battery through a cutting process, in which a large number of battery elements comprising positive active material layers, separators having electrolytes and negative active material layers are installed in parallel under a state of parallel connection between a plate-like positive current collector plate and a negative current collector plate facing each other, and the respective battery elements are partitioned with respect to each other and sealed by insulators, and a portion between adjoining battery elements of at least one of said current collector plates is narrowed such that a penetration portion is formed.

4. A battery precursor as set forth in claim 3, in which a width of said narrowed portion is 0.2 to 1.0 mm.

5. A battery precursor as set forth in claim 3, in which a distance of the penetration portion normal to the width of said narrowed portion is 0.1 mm to 1.0 mm.

6. A battery precursor for producing a battery through a cutting process, in which a large number of battery elements comprising positive active material layers, separators having electrolytes and negative active material layers are installed in parallel under a state of parallel connection between a plate-like positive current collector plate and a negative current collector plate facing each other, and the respective battery elements are partitioned with respect to each other and sealed by insulators, and penetration portions are formed on parts between adjoining battery elements of said respective current collector plates, the penetration portion of the positive current collector plate faces on a non-penetration portion of the negative current collector plate, and the penetration portion of the negative current collector-plate faces on a non-penetration portion of the positive current collector plate.

7. A battery precursor for producing a battery through a cutting process, in which a large number of battery elements comprising positive active material layers, separators having electrolytes and negative active material layers are installed in parallel under a state of parallel connection between a plate-like positive current collector plate and a negative current collector plate facing each other, and the respective battery elements are partitioned with respect to each other and sealed by insulators, and slitted penetration portions are formed on parts between adjoining battery elements of at least one of said current collector plates, and recessed portions are formed on parts of the insulator facing on the penetration portions.

8. A battery precursor as set forth in claim 7, in which penetration portions are formed on said current collector plates, the penetration portion of the positive current collector plate faces on a non-penetration portion of the negative current collector plate, and the penetration portion of the negative current collector plate faces on a non-penetration portion of the positive current collector plate.

9. A battery precursor as set forth in claim 7, in which the recessed portion has an acute-angled bottom formed by cutting-in, and has at its opening a swollen portion formed along an edge of the penetration portion.

10. A battery precursor as set forth in claim 7, in which penetration portions which penetrate any of said battery elements are formed on parts of the positive current collector plate and the negative current collector plate contacting with corners of the respective battery elements, the penetration portion of the positive current collector plate faces on a non-penetration portion of the negative current collector plate, and the penetration portion of the negative current collector plate faces on a non-penetration portion of the positive current collector plate.

11. A battery precursor as set forth in claim 7, having a thickness larger than 0.15 mm incl. and smaller than 1 mm incl.

12. A battery precursor for producing a battery through a cutting process, in which a large number of battery elements comprising positive active material layers, separators having electrolytes and negative active material layers are installed in parallel under a state of parallel connection between a plate-like positive current collector plate and a negative current collector plate facing each other, and the respective battery elements are partitioned with respect to each other and sealed by insulators, and the battery precursor is held by a retainer plate by being bonded to the plate at one side of said current collector plates.

13. A battery precursor as set forth in claim 12, in which the retainer plate is a semi-sticky film.

14. A battery precursor as set forth in claim 13, in which an adhesive strength of the semi-sticky film is created by a surface property of the film.

15. A battery precursor as set forth in any one of claim 1, 2, 3, 6, 7 or 12, in which its has a thickness smaller than 5 mm incl. and the insulator has a width of smaller than 3 mm incl.

16. A battery precursor as set forth in any one of claim 1, 2, 3, 6, 7 or 12, in which the insulator is made of a material deformable by pressure.

17. A battery precursor as set forth in any one of claim 1, 2, 3, 6, 7 or 12, in which the separator is a solid electrolyte.

18. A battery constructed by integrating plural plate-like unit batteries, in which the unit batteries are so integrated on a plane as to be connected in parallel in a selectable direction, and unit battery is constructed such that a battery element comprising a positive active material layer, a separator having an electrolyte and a negative active material layer is sandwiched between a plate-like positive current collector plate and a negative current collector plate facing each other and the battery element is surrounded and sealed by an insulator.

19. A battery as set forth in claim 18, in which a part between adjoining battery elements of at least one of the positive current collector plate and the negative current collector plate is narrowed because a penetration portion is formed thereat, and a width of the narrowed part is larger than 0.2 mm and smaller than 1.0 mm.

20. A battery as set forth in claim 18, in which a peripheral edge of at least one of the positive current collector plate and the negative current collector plate is located at an inside of the insulator.

21. A battery as set forth in claim 18, in which a slitted penetration portion is formed on a part between adjoining battery elements of at least one of the positive current collector plate and the negative current collector plate, a recessed portion is formed at a part of insulator racing on the penetration portion, and battery elements are laminated by being bent at the penetration portion and the recessed portion.

22. A battery as set forth in claim 21, in which the recessed portion has an acute-angled bottom formed by cutting-in, and has at its opening a swollen portion along an edge of the penetration portion.

23. A battery as set forth in claim 21, in which penetration portions penetrating any of the battery elements are formed on parts of the positive current collector plate and the negative current collector plate contacting with corners of the respective battery elements, the penetration portion of the positive current collector plate faces on a non-penetration portion of the negative current collector plate, and the penetration portion of the negative current collector plate faces on a non-penetration portion of the positive current collector plate.

* * * * *